United States Patent [19]

Cassou

[11] Patent Number: 4,457,263

[45] Date of Patent: Jul. 3, 1984

[54] ANIMAL ENCLOSURE

[76] Inventor: Bertrand Cassou, Saint Symphorien les Bruyères, 61300 L'Aigle, France

[21] Appl. No.: 389,050

[22] Filed: Jun. 16, 1982

[30] Foreign Application Priority Data

Apr. 27, 1982 [EP] European Pat. Off. ............ 82400753

[51] Int. Cl.³ ............................................ A01K 31/02
[52] U.S. Cl. ........................................ 119/17; 49/34; 119/18; 119/22; 119/63
[58] Field of Search ...................... 119/17, 18, 21, 22, 119/59, 63; 49/34, 38; 160/222, 223

[56] References Cited

U.S. PATENT DOCUMENTS 979,027 12/1910 Nielsen ................................... 49/34
2,237,106 4/1941 Minert ................................... 49/34

FOREIGN PATENT DOCUMENTS 24996 10/1951 Finland ................................ 119/63

Primary Examiner—Jay N. Eskovitz
Attorney, Agent, or Firm—Kenyon & Kenyon

[57] ABSTRACT

The invention relates to an animal enclosure. Prior animal enclosures, especially batteries of cages, have posed problems of manufacturing cost, noise and inconvenience of door actuation, and risk of injury to the animals inside. The present invention provides an animal enclosure in which a loop and frame move along a path. The frame has an opening in it so as to provide access to the enclosure and the loop otherwise closes off the enclosure. The invention is applicable to cattle pens and to batteries of poultry rearing cages.

16 Claims, 4 Drawing Figures

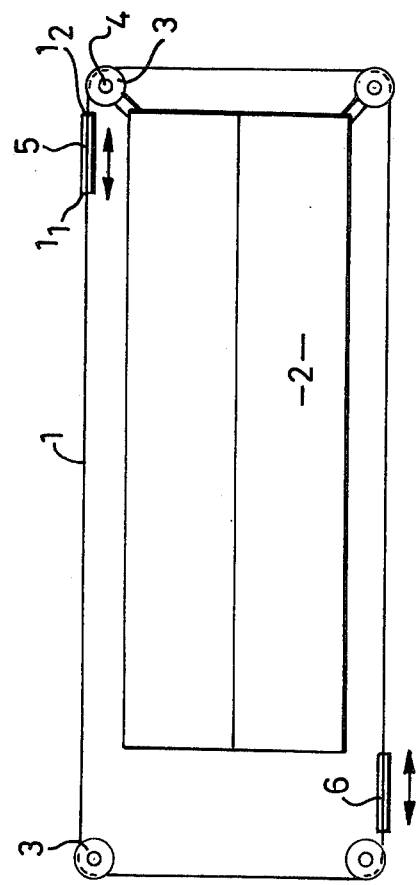
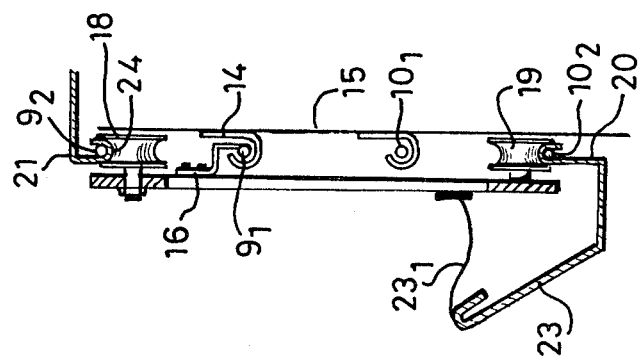
FIG.4
FIG.3

ANIMAL ENCLOSURE

The present invention relates to animal enclosures, and more specifically to unitary enclosures such as cattle pens for example, and also to compartmented enclosures. Compartmented enclosures in the form of batteries or arrays of cages are used in rearing poultry for example (such as hens, turkeys, guinea fowl, and pheasants), the cages usually being arranged contiguously in parallel and superposed rows forming a compact set along which apparatus for feeding, medicating, or inseminating the animals in the cages may be displaced readily, the cages having openings facing outwards in a common longitudinal and vertical plane.

In a known battery of this kind, the doors closing the cages are formed, like the rest of the structure, from metal bars welded together to form shutters opening inwards, or preferably outwards, and hinged on horizontal or vertical hinges. The shutters may be associated with automatic return devices for closing them when released, and locks for keeping them shut once returned to the closed position.

This battery contains several hundred cages and the manufacture, installation and actuation of the doors pose considerable problems, especially since there are as many doors as there are cages. Independently of the manufacturing cost, the design of the doors is a difficult problem since risk of injury to animals in the cages must be avoided. The doors used heretofore are only partially satisfactory, and it is not uncommon for animals to be distressed or injured during door opening or closure. Moreover, welded bars often present sharp angles which may wound animals as they pass their heads through the bars to eat from troughs disposed outside the cages and extending along the battery.

The present invention relates to a new design of enclosure avoiding some or all of the above disadvantages or presenting new advantages and, for example, may enable manufacturing costs to be reduced, animal injuries and/or stress to be reduced, and rapid easy access to a chosen part of the interior of the enclosure to be obtained.

The present invention provides an animal enclosure comprising at least one loop extending along a path and a frame having a frame opening, said loop presenting two ends secured to opposite sides of said frame, and said loop and said frame being displaceable lengthwise of said path so as to displace said frame between a first position in which said frame enables passage of an animal through said frame opening and a second position remote from said first position in which a part of said loop extends across said first position to bar passage of the animal through the first position. The loop replaces the rigid door of prior enclosures. The loop may be made from cable or other flexible elongated filaments, for example.

A preferred embodiment of the invention comprises a plurality of said loops extending along respective paths, each loop being secured to said frame, whereby a part said loops simultaneously extend across bar said first position when said frame is in said second position.

According to one preferred feature of the invention the enclosure includes pulley means for guiding said loops and adjustment means for adjusting the positions of said pulley means in directions longitudinal and transverse to said path to adjust the tensions of said loops and their relative positions.

Other features and advantages of the invention will appear from the following description given by way of example with reference to the accompanying drawings, in which:

FIG. 3 is a partial sectional view of the movable window and associated guide means; and FIG. 4 is a diagrammatic plan view of an alternative embodiment of the invention.

Figure 1:
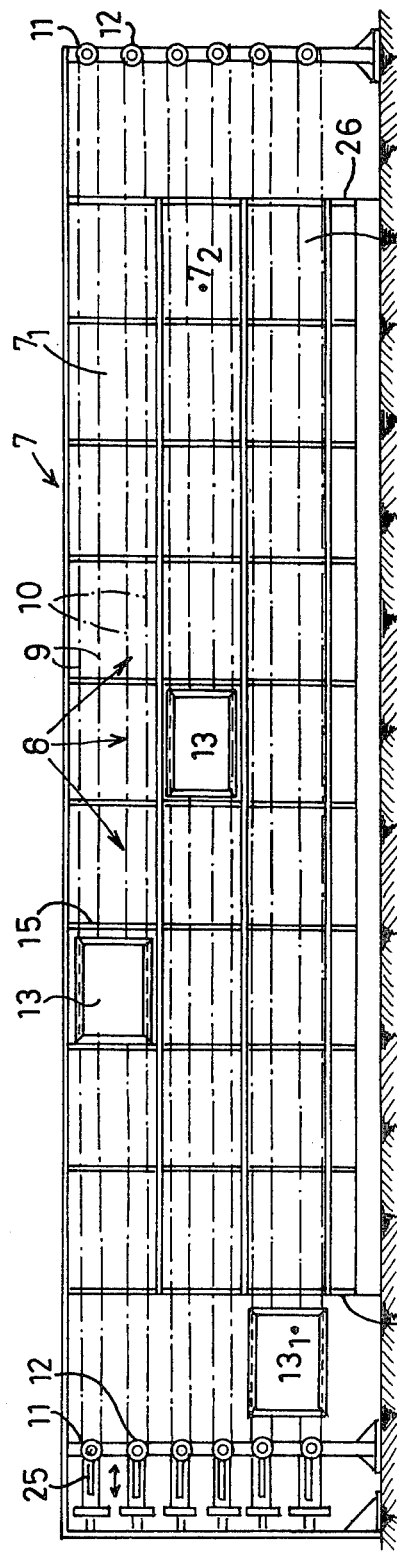
FIG. 1 is an elevational view of a battery of cages in accordance with the invention.

The invention is applicable to different enclosures for containing animals. The invention is applicable to a variety of types of enclosures, including cages, and batteries of cages (as shown in FIG. 1) and also pens for confining or sorting animals (as shown in FIG. 4) for example.

In the embodiments shown in the drawings, the enclosure is at least partly closable by horizontal cables or wires, which may or may not be electrified, and this system is applicable to a variety of enclosures suitable for different size animals. It is sufficient to use cables of suitable cross-section and strength, and appropriate means for guiding the cables, chosen as a function of the dimensions of the enclosure and the size of the animal. A particular advantage in the application of the invention to sorting animals is that the movable window or frame can be displaced to a chosen position round the edge of the enclosure, giving access directly to an animal standing at a particular adjacent point within the enclosure. A system of this kind is illustrated by the embodiment of FIG. 4, in which the cables 1 form endless loops extending horizontally, parallel and spaced apart in relation to the height of the enclosure, these cables surrounding almost the whole periphery of the enclosure, which may be a single pen or may be subdivided into several pens. The cables are guided on pulleys or grooved rollers 3 mounted for rotation about axes 4 in both directions. The two extreme ends $1_1$ and $1_2$ of each of the cables 1 are connected to opposite sides of a movable frame 5 forming a window in the enclosure. The frame can be assimilated to a door extending the full height of the enclosure, enabling the passage of an animal, and the opening may be coupled to a cattle transport vehicle, or communicated with another enclosure which is a often required in sorting units.

The cables 1 connected to the movable frame or window 5 may comprise a second window 6 associated with the opposite side of the enclosure to the window 5, so as to enable two operators to work simultaneously. It is clear that the windows may be displaced either manually or, if they are heavy (which is likely to be the case for those used in cattle pens), by automatically controlled means such as motors. This type of installation is extremely simple since, besides the pulleys and cables, it is sufficient to provide on the paths of the cables guide members which may comprise simple U-brackets or supports in the form of gutters fixed on the vertical pillars of the enclosure.

Figure 2:
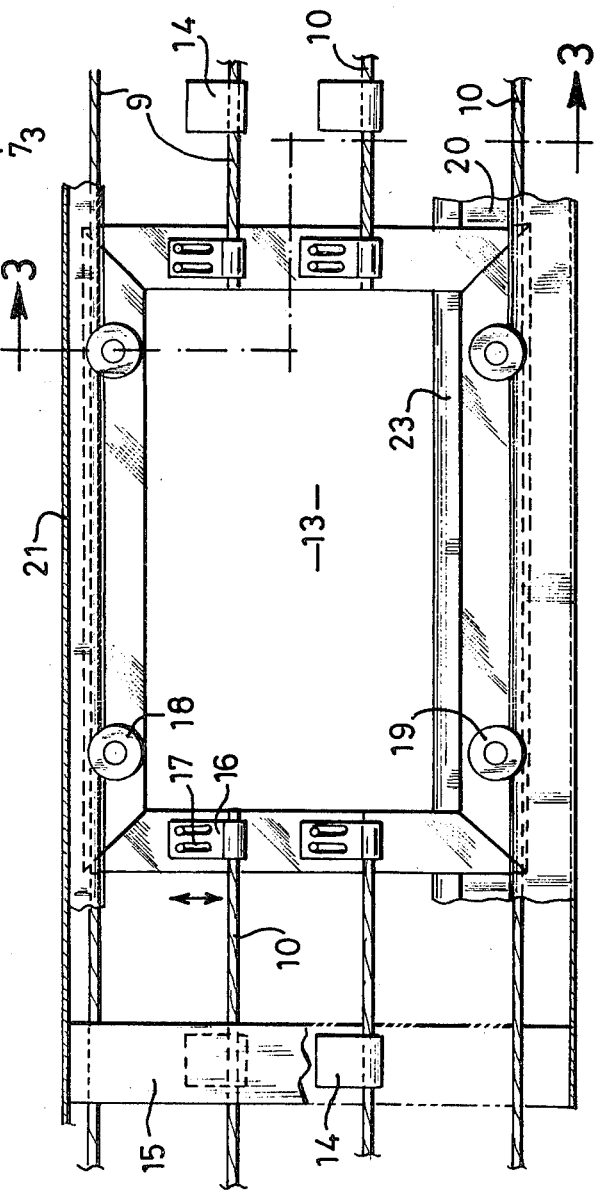
FIG. 2 is an elevational view of the detail of a movable frame or window, seen from the inside of a cage.

A more particular, but not exclusive, application of the invention is to compartmented enclosures, such as batteries of cages for receiving animals, and especially those used for rearing poultry. One example of such an embodiment is shown in FIGS. 1 to 3, in which FIG. 1 shows in elevation a battery of cages 7 disposed in three superposed rows or stories $7_1$, $7_2$ and $7_3$. The arrangements may be identical for each of the rows, and so the following description will refer to a single one of the rows, it being understood that the other rows are similar.

The cages of each row are aligned contiguously in a single longitudinal plane and their access openings 8 face in the same direction so as to be readily accessible. In this case, the access openings 8 of the cages are disposed in the longitudinal face of the battery and extend in the same vertical plane. The openings 8 correspond substantially to the full width and height of the cage and are normally closed in accordance with the invention by two cables 9 and 10 which extend along parallel separate paths, each cable forming a respective endless loop and being mounted displaceably, in translation, lengthwise in alternative directions, on respective sets 11 and 12 of pulleys. The two ends of each cable are secured to a movable frame or window 13 which can be positioned selectively in front of any one of the windows 8 of the associated row of cages.

FIG. 2 shows in more detail the manner in which the cables and movable windows are guided and supported. The cables are mounted stretched as described above on the sets of pulleys 11 and 12 and are also guided at intervals along their length by brackets 14 fixed to the pillars or uprights 15 of the cages, the brackets 14 extending outwardly from the uprights 15 in the shape of gutters (as shown in FIG. 3) in which the inner reaches $9_1$ and $10_1$ of the cables 9 and 10. The ends of the cables are welded or crimped to fasteners 16 which are bolted to the inner face of the movable window 13. These fasteners or fixing tabs are also shown in FIG. 2, which is an elevational view showing the movable window from inside a cage. It will be seen that the fixing tabs 16 comprise elongate slots 17 enabling adjustment of the height of the cables. In this way the relative positions of the cables can be modified so as to adjust their spacing to the size of the animals. For the same purpose, the heights of the pulleys 11 and 12 can be adjusted by a screw or crank (not shown) again enabling the spacing between the two inner reaches $9_1$ and $10_1$ of the cables 9 and 10 to be adjusted as desired.

In addition to the guide members positioned at intervals along the paths of the cables, the window itself comprises means aiding its displacement and positioning in the vertical plane of the cage openings. These means comprise parts of rollers 18 and 19 rolling on guide rails 20 and 21. The lower rail 20 on which roll the pair of rollers 19 is conveniently formed by the inner edge 22 of a feeding trough 23 which extends along the row of cages, the edge 22 being bent over in an arch to form both an underneath groove within which slides the outer reach $10_2$ of the cable 10 and also a top convex rail, the curvature of the rail corresponding to the curvature of the grooves in the rollers 19. In this way the bottom of the window 13 is guided along the whole length of the row of cages. The top of the window 13 is guided in a similar manner, since the pair of rollers 18 roll on a shaped guide strip 21 whose edge 24 is turned up to form a channel on the underneath of which rolls the pair of rollers 18 and within which slides the outer reach $9_2$ of the cable 9. This strip 21, like the feeding trough 23, extends along the whole length of the row of cages, to form a rigid rail for the window 13.

The movable window 13 comprises an open-centered frame which offers access to the inside of a cage to which it is juxtaposed, the dimensions of the frame corresponding substantially to the dimensions of the openings in the cages so as to enable an animal to be extracted from or introduced into a cage to which the window is presented without difficulty, and without distressing or hurting the animal.

Moreover, and to enable access simultaneously to the whole row of cages, if desired, the sets of pulleys 11 and 12 are associated with tensioners 25 (see FIG. 1) which may be of a suitable design comprising endless screws and nuts enabling the pulleys to be displaced in the longitudinal plane, perpendicularly to the axes of the pulleys. Individual adjustment of the pulleys thus enables one cable to be kept under tension while the other is slackened. For example, if it is desired to gain access to the openings of all the cages in the row, the upper cable 9 could be slackened while the lower cable 10 is kept taut, which will free the top halves of the cage openings. The freed part will be sufficient to introduce an animal into the cage, and the animal will be retained by the taut cable 21 and will not escape from the cages even though the cable 9 is slack. When all the cages have been filled with animals, the cable 9 will be tensioned again to again play its role of a flexible bar.

The cables may extend beyond the side 26 of the battery of cages, as shown in FIG. 1, so that the windows 13 can be taken away from the openings of the cages and parked, as shown at $13_1$. The parking of the window in this way could alternatively be replaced by the use of a screen or grill (not shown) which may be hooked or clipped onto the window 13 so as to close it off when the system is to be shut; the shutter or screen is preferably arranged to prevent the animal escaping while still enabling the animal to reach through the frame to the feeding trough 23.

The movable window may be displaced manually or alternatively in association with automatically controlled means such as an electric motor. Moreover, batteries of cages are often supplied by feed dispensers whose displacement and pre-programmed operation, and it is then possible to secure one edge of the window to the automatic feed dispenser to move with it. Alternatively, boards or other means for constraining the animals during artificial insemination may be secured to the windows. Moreover, the window may also be used to displace a trough cover $25_1$ comprising a flexible panel or strip; thus, as the window moves along the feed trough 23 (see FIG. 3) a strip or canvas connected to the window can progressively move along the trough covering the part adjacent to the window as the window movers along the cages. The trough cover may itself form a second trough for offering another type of food; this second trough may be of the kind comprising two hoppers, the upper hopper serving to present the alternative type of food for eating in a controlled quantity and the lower hopper serving to collect the leftovers when the movable trough is wound up.

It is also possible, in accordance with the invention for some or all of the cables to be connected to a low voltage electrical generator for periodically electrifying the cables. This arrangement may be particularly useful when the cages are being filled with animals and one of the cables is slackened as suggested above. In this case, the lower cable 10 may be electrified so that the animals stay at the back of the cages, and do not jump over the cable 10 while the cable 9 is slackened.

The invention has many advantages. For example, separate doors of the cages arranged in a row are no longer required, but are replaced by a single door - the movable window. This significantly reduces labor times in that a worker no longer has to open and close doors repeatedly for each of the operations he has to perform on each animal (vaccination, medicating, trimming beaks, artificial insemination, loading and unloading the animals). The animal can feed peacefully otherwise by putting its head out between the cables without discomfort or risk of injury. The window also forms an effective marker which indicates to the operator the cage he has been working on even if his work is interrupted. The cages shut by the cables are efficiently closed without risk of the animals escaping due to carelessness. Problems relating to the manufacture, wearing out and aging of individual doors are avoided, and tests prove that productivity is increased due to a significant reduction in stress of the animals, who are badly disturbed in certain prior batteries by the banging of hinged doors or trap doors.

Lastly, as shown in FIG. 4, it is possible to provide windows in sets of two or even more on a given cable, enabling two or more operators to work simultaneously without hindering each other. The example of FIG. 4 referred to at the beginning of the present description relates to a cattle pen, but can also be applied to batteries of poultry cages, in which case the system is similar to that of FIGS. 1 and 2 but with the differences that the axes of the pulleys 11 and 12 are vertical (like pulleys 3 in FIG. 4), the endless loops extending in horizontal planes round the battery instead of in vertical planes on the front face of the battery.

I claim:

1. An animal enclosure comprising at least one loop extending along a path, an array of compartments each presenting a compartment opening along which said path extends, a frame having a frame opening through which an animal can pass, said loop having two ends secured to opposite sides of said frame, said loop and said frame being displaceable along said path so as to successively position said frame adjacent a one of said compartment openings and permit passage of an animal to or from the compartment opening located adjacent said frame opening through said frame opening, part of said loop extending across at least one of said compartment openings not located adjacent said frame opening to inhibit passage of an animal to or from said at least one compartment opening.

2. An enclosure as claimed in claim 1 wherein said path surrounds said enclosure in a plane perpendicular to said openings.

3. An enclosure as claimed in claim 1 wherein said path extends in a plane parallel to said openings.

4. An enclosure as claimed in claim 1 and comprising a plurality of said loops extending along respective paths, each loop being secured to said frame with part of said loops simultaneously extending across said at least one compartment opening at said second position.

5. An enclosure as claimed in claim 4 and including pulley means for guiding said loops and adjustment means for adjusting the positions of said pulley means in directions longitudinal and transverse to said path for adjusting the tensions of said loops and their relative positions.

6. An enclosure as claimed in claim 1 and including support means extending along said path supporting said loop, said support means presenting at least one channel in which said loop lays.

7. An enclosure as claimed in claim 6 and including a guide member defining said support means and at least one rail extending parallel to said path, said frame comprising roller means engaging said rail to guide and support said frame.

8. An enclosure as claimed in claim 1 wherein said guide member defines a trough for containing feed for an animal in the enclosure.

9. An enclosure as claimed in claim 1 and including a plurality of said frames secured to said loop at spaced positions.

10. An enclosure as claimed in any claim 1 and including a board having means for constraining an animal thereon, for artificial insemination, and means for attaching said board to said frame.

11. An enclosure as claimed in claim 1 comprising drive means for displacing said loop, said drive means including automatic feed dispensing means.

12. An enclosure as claimed in claim 11 wherein said drive means includes an electric motor.

13. An enclosure as claimed in claim 1 wherein said loop is electrically conductive, and including means for selectively electrifying said loop.

14. An enclosure as claimed in claim 6 wherein said frame includes projections to which said loop is secured, said projections being disposed to move in said channel as said frame moves along said path.

15. An animal enclosure comprising at least one loop extending along a path, a frame having a frame opening through which an animal can pass, said loop having two ends secured to opposite sides of said frame, said loop and said frame being displaceable along said path between a first location of said path in which said frame enables passage of an animal into or from said enclosure through said frame opening and a second location of said path remote from said first location in which a part of said loop extends across said first location to inhibit passage of an animal into or from said enclosure at said first location, a trough for feed extending along said path and cover means mounted to said frame for partially covering said trough.

16. An enclosure as claimed in claim 15 wherein said cover means presents a further trough for an alternative feed.

* * * * *